(12) United States Patent
You et al.

(10) Patent No.: US 12,309,659 B2
(45) Date of Patent: May 20, 2025

(54) INDICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 204 days.

(21) Appl. No.: 17/701,152

(22) Filed: Mar. 22, 2022

(65) Prior Publication Data

US 2022/0217588 A1    Jul. 7, 2022

Related U.S. Application Data

(63) Continuation of application No. PCT/CN2019/112859, filed on Oct. 23, 2019.

(51) Int. Cl.
*H04W 36/30* (2009.01)
*H04W 36/00* (2009.01)
*H04W 36/06* (2009.01)
*H04W 76/19* (2018.01)

(52) U.S. Cl.
CPC ..... *H04W 36/305* (2018.08); *H04W 36/0016* (2013.01); *H04W 36/0055* (2013.01); *H04W 36/06* (2013.01); *H04W 76/19* (2018.02)

(58) Field of Classification Search
None
See application file for complete search history.

(56) References Cited

U.S. PATENT DOCUMENTS

| | | | | |
|---|---|---|---|---|
| 2021/0028849 | A1* | 1/2021 | Chin | H04B 7/06964 |
| 2021/0105058 | A1* | 4/2021 | Lin | H04W 76/19 |
| 2022/0039077 | A1* | 2/2022 | Koskela | H04B 7/0695 |
| 2022/0061087 | A1* | 2/2022 | Koskela | H04W 72/21 |

FOREIGN PATENT DOCUMENTS

| | | |
|---|---|---|
| CN | 110022611 A | 7/2019 |
| CN | 110149177 A | 8/2019 |
| WO | 2019032882 A1 | 2/2019 |
| WO | 2019135654 A1 | 7/2019 |
| WO | 2019192713 A1 | 10/2019 |

(Continued)

OTHER PUBLICATIONS

Extended European Search Report issued in corresponding European application No. 19950173.5, mailed Jul. 22, 2022.

(Continued)

*Primary Examiner* — Mohammad S Adhami
(74) *Attorney, Agent, or Firm* — BAYES PLLC

(57) ABSTRACT

Disclosed are an indication method, a terminal device, a network device, a chip, a computer readable storage medium, a computer program product, and a computer program. The method includes: sending, by a terminal device, a Beam Failure Recovery (BFR) Media Access Control (MAC) Control Element (CE) to a network device. The BFR MAC CE is used to indicate at least one Secondary Cell (SCell) where a beam failure occurs.

20 Claims, 4 Drawing Sheets

```
Send, by a terminal device, a Beam Failure Recovery (BFR) Media Access Control
           (MAC) Control Element (CE) to a network device
```

(56) References Cited

FOREIGN PATENT DOCUMENTS

WO  2019193239 A1  10/2019

OTHER PUBLICATIONS

Qualcomm Incorporated, "Procedures and MAC CE design for BFR for SCells", R2-1913833, 3GPP TSG-RAN WG2 Meeting #107bis Chongqing, China, Oct. 14-18, 2019.

Vivo, "Text Proposal for 38.321 of SCell BFR", R2-1912352, 3GPP TSG-RAN WG2 Meeting #107bis ChongQing, China, Oct. 14-18, 2019.

Nokia et al., "Candidate detection and MAC CE format for SCell BFR", R2-1913224, 3GPP TSG-RAN WG2 Meeting #107bis Chongqing, China, Oct. 14-18, 2019.

International Search Report issued in corresponding International Application No. PCT/CN2019/112859, mailed Jul. 22, 2020, 31 pages.

Written Opinion of the International Searching Authority issued in corresponding International Application No. PCT/CN2019/112859, mailed Jul. 22, 2020, 7 pages.

"RAN2 specification impacts of SCell BFR", Agenda Item: 11.6, Source: vivo, 3GPP TSG-RAN WG2 Meeting #107 R2-1909781, Prague, Czech Republic, Aug. 26-30, 2019, 6 pages.

"3rd Generation Partnership Project; Technical Specification Group Radio Access Network; NR; Radio Resource Control (RRC) protocol specification (Release 15)", 3GPP TS 38.331, V15.5.1 (Apr. 2019), 489 pages.

First Office Action issued in corresponding European application No. 19950173.5, mailed Apr. 29, 2024.

Source: MediaTek Inc.; Title: Support BFR for SCell; R2-1913240 3GPP TSG-RAN WG2 Meeting #107Bis Chongqing, China, Oct. 14-18, 2019.

\* cited by examiner

Send, by a terminal device, a Beam Failure Recovery (BFR) Media Access Control (MAC) Control Element (CE) to a network device Receive, by a network device, a BFR MAC CE sent from a terminal device

INDICATION METHOD, TERMINAL DEVICE, AND NETWORK DEVICE

CROSS-REFERENCE TO RELATED APPLICATION

This application is a continuation of International Application No. PCT/CN2019/112859, filed Oct. 23, 2019, the contents of which are incorporated herein by reference in its entirety.

TECHNICAL FIELD

Embodiments of the present disclosure generally relate to the information processing technical field, and more particularly, to an indication method, a terminal device, a network device, a chip, a computer-readable storage medium, a computer program product and a computer program.

BACKGROUND

In related arts, Beam Failure Recovery (BFR) is standardized for a Primary Cell (PCell) or a PSCell (collectively referred to as Special Cell, SpCell). A terminal device can tell a network device through random access which downlink transmission beam is used to send the RAR to restore the downlink beam. However, after the introduction of the Secondary Cell (SCell), how to enable the network device to know the situation of a SCell where the terminal device has a beam failure is a problem that needs to be solved.

SUMMARY

In order to solve the above technical problem, embodiments of the present disclosure provide an indication method, a terminal device, a network device, a chip, a computer-readable storage medium, a computer program product and a computer program.

According to a first aspect, there is provided an indication method, including:
  sending, by a terminal device, a Beam Failure Recovery (BFR) Media Access Control (MAC) Control Element (CE) to a network device;
  wherein the BFR MAC CE is used to indicate at least one Secondary Cell (SCell) where a beam failure occurs.

According to a second aspect, there is provided an indication method, including:
  receiving, by a network device, a Beam Failure Recovery (BFR) Media Access Control (MAC) Control Element (CE) sent from a terminal device;
  wherein the BFR MAC CE is used to indicate at least one Secondary Cell (SCell) where a beam failure occurs.

According to a third aspect, there is provided a terminal device, including:
  a first communication unit configured to send a Beam Failure Recovery (BFR) Media Access Control (MAC) Control Element (CE) to a network device;
  wherein the BFR MAC CE is used to indicate at least one Secondary Cell (SCell) where a beam failure occurs.

According to a fourth aspect, there is provided a network device, including:
  a second communication unit configured to receive a Beam Failure Recovery (BFR) Media Access Control (MAC) Control Element (CE) sent from a terminal device;
  wherein the BFR MAC CE is used to indicate at least one Secondary Cell (SCell) where a beam failure occurs.

According to a fifth aspect, there is provided a terminal device including a processor and a memory configured to store a computer program, wherein the processor is used to call and run the computer program stored in the memory to perform the method according to any one of the first aspect or any implementation of the first aspect.

According to a sixth aspect, there is provided a network device including a processor and a memory configured to store a computer program, wherein the processor is used to call and run the computer program stored in the memory to perform the method according to any one of the second aspect or any implementation of the second aspect.

According to a seventh aspect, there is provided a chip configured to perform the method according to any implementation as described above.

Specifically, the chip includes a processor configured to call and run a computer program stored in a memory to cause a device in which the chip is installed to perform the method according to any one of the first to third aspects or any implementation of the first to third aspects.

According to an eighth aspect, there is provided a computer-readable storage medium configured to store a computer program, wherein the computer program is configured to cause a computer to perform the method according to any one of the first to third aspects or any implementation of the first to third aspects.

According to a ninth aspect, there is provided a computer program product including computer program instructions that cause a computer to perform the method according to any one of the first to third aspects or any implementation of the first to third aspects.

According to a tenth aspect, there is provided a computer program. When the computer program runs on a computer, the computer is caused to perform the method according to any one of the first to third aspects or any implementation of the first to third aspects.

By the above solutions, the terminal device indicates to the network device at least one SCell where the beam failure occurs, so that the network device can know the current number of SCells where the beam failure occurs for the terminal device, and then determine a corresponding uplink grant resource allocated to the terminal device. In this way, the technical solutions can improve the processing efficiency of network device and resource utilization.

DETAILED DESCRIPTION

In order to understand the features and technical contents of embodiments of the present disclosure in more detail, embodiments of the present disclosure will be described in detail below with reference to the accompanying drawings. The attached drawings are for reference and explanation purposes only, and are not used to limit the embodiments of the present disclosure.

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on.

Figures 1, 2, 3:
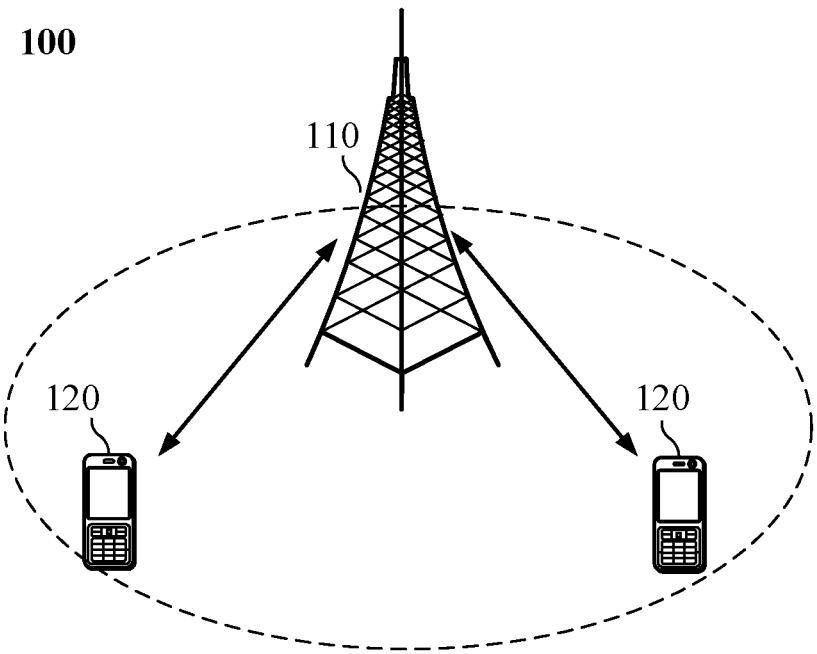
FIG. 1 is a schematic diagram of a communication system architecture according to an embodiment of the present disclosure.
FIG. 2 illustrates a flowchart of an indication method according to an embodiment of the present disclosure.
FIG. 3 illustrates a flowchart of another indication method according to an embodiment of the present disclosure.

Exemplarily, the communication system 100 in which embodiments of the present disclosure may be applied is as shown in FIG. 1. The communication system 100 may include a network device 110. The network device 110 may be a device that communicates with a UE 120 (or called a communication terminal or a terminal). The network device 110 may provide communication coverage for a specific geographic area, and may communicate with UEs located in the coverage area.

According to some embodiments, the network device 110 may be a network device (Base Transceiver Station, BTS) in a GSM system or a CDMA system, or a network device (NodeB, NB) in a WCDMA system, or an evolutional network device (Evolutional Node B, eNB or eNodeB) in a LTE system, or a wireless controller in a Cloud Radio Access Network (CRAN), or the network device can be a mobile switching center, a relay station, an access point, an in-vehicle device, a wearable device, a hub, a switch, a bridge, a router, a network side devices in 5G networks, or a network device in the future evolved Public Land Mobile Network (PLMN), etc.

The communication system 100 further includes at least one UE 120 within the coverage area of the network device 110. The "UE" used herein may be connected in the following manners (including but not limited to): The UE may be connected via wired lines, such as via Public Switched Telephone Networks (PSTN), Digital Subscriber Line (DSL), digital cables, and direct cable connections; and/or the UE may be connected via another data connection/network; and/or the UE may be connected via a wireless interface, such as cellular networks, wireless local area network (WLAN), digital TV networks such as DVB-H networks, satellite networks, AM-FM broadcast transmitter; and/or the UE is connected via a device of another UE which is configured to receive/send communication signals; and/or the UE is connected via an Internet of Things (IoT) device. A UE set as communicating through a wireless interface may be referred to as a "wireless communication terminal", a "wireless terminal" or a "mobile terminal".

According to some embodiments, Device to Device (D2D) communication may be performed between the UEs 120.

It should be understood that the terms "system" and "network" are often used interchangeably herein. The term "and/or" herein is only an association relationship describing associated objects, which means that there can be three kinds of relationships, for example, A and/or B can mean: A alone, B alone, and A and B together.

In addition, the character "/" generally indicates that the associated objects before and after "/" are in an "or" relationship.

In order to understand the features and technical contents of embodiments of the present disclosure in more detail, embodiments of the present disclosure will be described in detail below with reference to the accompanying drawings. The attached drawings are for reference and explanation purposes only, and are not used to limit embodiments of the present disclosure.

An embodiment of the present disclosure provides an indication method, which is applied to a terminal device. As shown in FIG. 2, the method includes:

In step 21, the terminal device sends a Beam Failure Recovery (BFR) Media Access Control (MAC) Control Element (CE) to a network device.

The BFR MAC CE is used to indicate at least one Secondary Cell (SCell) where a beam failure occurs.

Correspondingly, an embodiment further provides an indication method. As shown in FIG. 3, the method includes:

In step 31, the network device receives the BFR MAC CE sent by the terminal device.

The BFR MAC CE is used to indicate at least one Secondary Cell (SCell) where a beam failure occurs.

The network device may be a base station on the network side, such as eNG, gNB, etc., and not all embodiments are listed herein.

Here, the BFR is introduced. In related arts, Beam Failure Recovery (BFR) is standardized for a Primary Cell (PCell) or a PSCell (collectively referred to as Special Cell, SpCell), or the PCell of the Master Cell Group (MCG) or the PSCell of the Secondary Cell Group (SCG). A terminal device can tell a base station through random access which downlink transmission beam is used to send the RAR to restore the downlink beam. The random access preamble of the New Radio (NR) Random Access (RA) is configured per SSB. The UE first performs compassion of RSRP to select a SSB/CSI-RS index that meets a threshold (there is a link relationship between SSB and CSI-RS), and uses a preamble and PRACH resource corresponding to the SSB to send Msg1. That is to say, after the gNB receives the preamble, the gNB knows which SSB is used to feed back the RAR.

The overall BFR procedure includes the following steps:
1. Beam failure detection: The physical layer measures CSI-RS and/or SS/PBCH blocks to determine whether the corresponding PDCCH quality meets a predetermined/configured threshold (Hypothetical BLER performance is worse than the threshold). If a beam failure is detected, the physical layer reports a beam failure instance to the MAC. For a MAC entity, whenever the physical layer reports a beam failure instance, the terminal device increments a counter (BFI- _COUNTER) by one and restarts a beam failure detection timer (Beam Failure Detection Timer). If the BFI_COUNTER reaches the maximum value during the running of the beamFailureDetectionTimer, it is considered that a beam failure occurs, and the terminal device initiates a random access procedure.
2. New candidate beam identification: The terminal device uses CSI-RS and/or SSB (SS/PBCH block) to select a new beam that meets a predetermined/configured threshold.
3. If no new beam that meets the conditions is selected, a contention-based random access procedure is adopted.
4. BFR request transmission: The terminal device selects a PRACH corresponding to a new beam to initiate transmission, or reports the selected new beam through PUCCH.
5. The terminal device detects a response of the base station (network device) for the BFR request.

However, the above-mentioned related arts mainly focus on the processing of BFR corresponding to the primary cell, and the SCell is introduced in R16. Embodiments of the present disclosure will describe the processing of BFR for the SCell in detail.

In the solutions provided in embodiments, the BFR MAC CE may include identity of at least one SCell where the beam failure occurs.

Alternatively, a bitmap is included in the BFR MAC CE; each bit in the bitmap is used to indicate whether beam failure occurs in a corresponding cell. Here, the corresponding cell can be: a secondary cell; or, a secondary cell configured with BFR configuration, or a primary cell and secondary cell.

Based on this, embodiments can provide multiple format types of BFR MAC CE. Specifically:

The BFR MAC CE format type includes at least one of the following: a first type of BFR MAC CE, a second type of BFR MAC CE, a third type of BFR MAC CE, and a fourth type of BFR MAC CE.

The first type of BFR MAC CE may be understood as a long MAC CE.

The second type of BFR MAC CE may be understood as a truncated long MAC CE.

The third type of BFR MAC CE may be a short MAC CE.

The fourth type of BFR MAC CE may be a truncated short MAC CE.

The types of BFR MAC CEs will be described separately.

Each of the first type of BFR MAC CE and the second type of BFR MAC CE includes a bitmap, and each bit in the bitmap is used to indicate whether a corresponding cell has a beam failure.

Each bit in the bitmap is used to indicate the corresponding cell which is a SCell;
or, each bit in the bitmap is used to indicate the corresponding cell which is a SCell configured with BFR configuration information;
or, each bit in the bitmap is used to indicate the corresponding cell which is a serving cell, and the serving cell is a Primary Cell (PCell) or a SCell.

Here, the SCell configured with BFR configuration information can be configured by the network device for the terminal device. Specifically, the network device can configure the SCell configured with BFR configuration information for the terminal device through RRC. Specifically, it can be that the network device sends RRC information to the terminal device to notify at least one SCell that supports BFR. The identity of the at least one SCell may be included, such as SCell index, and so on.

The third type of BFR MAC CE and the fourth type of BFR MAC CE include a SCell index.

The first type of BFR MAC CE and the third type of BFR MAC CE further include: a new beam identity corresponding to the at least one SCell where the beam failure occurs;
the second type of BFR MAC CE further includes a new beam identity corresponding to a part of the at least one SCell where the beam failure occurs, or does not include the new beam identity corresponding to the at least one SCell where the beam failure occurs;
the fourth type of BFR MAC CE includes the new beam identity corresponding to the at least one SCell where the beam failure occurs, or does not include the new beam identity corresponding to the at least one SCell where the beam failure occurs.

Examples are described below in detail.

Example 1

The first type of BFR MAC CE (or the second type of BFR MAC CE) contains a bitmap. The bitmap may contain multiple bits, and each bit is used to indicate whether a corresponding cell has a beam failure.

If a certain bit is set as a first value, it can be understood that the cell corresponding to the bit has a beam failure; if the bit is set as a second value, it can be understood that the cell corresponding to the bit has no beam failure.

The first value may be "1" and the second value may be "0". Of course, if the terminal device and the network device agree upon mutual agreement, the first value may be set to "0" and the second value can be set to "1".

The cells corresponding to the bitmap may be one or more SCells, or may be one or more SCells pre-configured to support BFR, or may be a primary cell and a SCell.

In addition, the length of the bitmap is determined by how many serving cells the terminal device supports.

For example, the terminal device supports 32 serving cells, and the bitmap is 4 bytes.

The cell corresponding to each bit in the bitmap can be preset, and each cell has a corresponding identity (ID), such as cell index. An ascending order (or descending order) of indexes may correspond to a sequencing order from top to bottom and from left to right (or from right to left) in the bitmap, so that each bit in the bitmap corresponds to a cell.

For example, if the cells corresponding to the bitmap are multiple SCells, the SCell index order (such as ascending or descending order) can correspond to the order from left to right (or from right to left) and from top to bottom in the bitmap, so as to indicate whether a corresponding SCell has a beam failure through a corresponding bit.

Or, if the cells corresponding to the bitmap are multiple SCells configured with BFR configuration information, the order (such as ascending or descending order) of indexes of the SCells configured with BFR configuration can correspond to the order from left to right (or from right to left) and from top to bottom in the bitmap, so as to indicate whether a corresponding SCell configured with BFR configuration information has a beam failure through a corresponding bit. The BFR configuration may be sent to the terminal device in advance by the network device, for example, the BFR configuration may be sent to the terminal device through information such as RRC, DCI, etc., and embodiments of the present disclosure do not impose specific limitations on this. In this case, the bits in the bitmap only need to indicate whether beam failure occurs in the SCells capable of performing BFR.

Or, if the cells corresponding to the bitmap includes both a primary cell and SCells, then a certain bit can be designated to indicate whether the primary cell has a beam failure, and the remaining bits can correspond to the Scells according to the aforementioned order to indicate whether a corresponding SCell has a beam failure.

Furthermore, the first type of BFR MAC CE may further include new beam identities corresponding to all SCells where beam failures occur. That is to say, for the first type of BFR MAC CE, if N bits in the bitmap are set as 1, it indicates that the SCells corresponding to the N bits have a beam failure. Correspondingly, the first type of BFR MAC CE further includes new beam identities corresponding to the N SCells where a beam failure occurs, and N is an integer greater than or equal to 1.

The new beam identity is: a SSB identity or a CSI-RS identity.

The new beam identity may be an identity of a beam that exceeds a preset quality threshold in a corresponding cell (such as a SCell) (for example, it may be an SSB identity or a CSI-RS identity that meets the preset quality threshold).

Specifically, during selection, if there are multiple beams that exceed the preset quality threshold in a cell (such as SCell), one of them can be randomly selected as the new beam to report; or, the beam with the best quality can be selected as a new beam; or, if there is no beam that meets the preset quality threshold, one beam can be reported arbitrarily, or a special value can be used to indicate to the network device the selected new beam.

The quality of a beam can be measured by parameters such as RSRP, SNR, etc. Correspondingly, the quality threshold can be one or a combination of a RSRP threshold and a SNR threshold, and embodiments of the present disclosure do not provide all examples.

Correspondingly, in an exemplary implementation, the first type of BFR MAC CE further includes second indication information for indicating that the beam identity is an SSB identity or a CSI-RS identity.

In this example, the second indication information may be a certain bit in the first type of MAC CE, and the bit is used to indicate that the following multiple bits are indicated SSB identities or CSI-RS identities.

The format of the first type of BFR MAC CE provided by this example will be described with reference to FIG. 4. In the figure:

S: used to use the bitmap to indicate whether BFR occurs for SCells.

For example, 1 represents that BFR occurs for a corresponding SCell, and 0 represents no BFR occurs.

S/C: used to indicate whether SSB ID or CSI-RS ID follows.

For example, 1 represents SSB, and 0 represents CSI-RS; of course, the reverse is also possible, as long as the terminal device and the network device negotiate with each other and achieve an agreement regarding the meaning of S/C. S/C may be the aforementioned second indication information.

SSB/CSI-RS ID: used to indicate the identity of SSB or CSI-RS. The maximum number of SSBs is 64, 6 bits, and the maximum number of CSI-RSs is 128, 7 bits or the number is 192, 8 bits.

It should be pointed out that whether the beam identity is SSB or CSI-RS may be pre-specified, for example, may be specified by a protocol, or may be negotiated between the terminal device and the network device; or, the network device may configure CSI-RS for one or more SCells for the terminal device, and accordingly, the new beam identity reported by the terminal device may be the CSI-RS identity.

Figure 4:
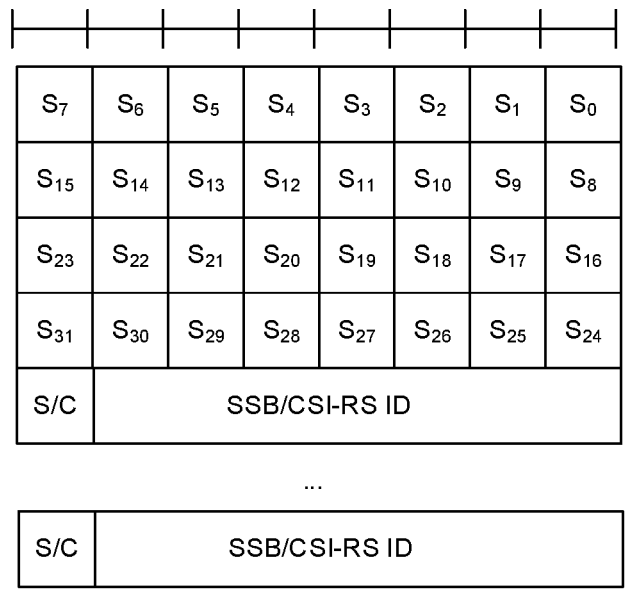
FIGS. 4 to 6 are three schematic diagrams of a MAC CE format according to embodiments of the present disclosure.
Figure 5:
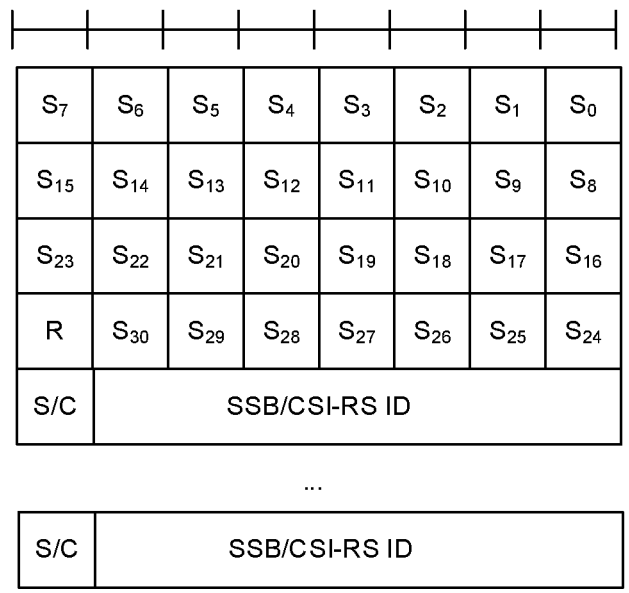

In the above case, the second indication information may not be included, the terminal device determines the beam identity as the SSB identity by default or pre-determines the beam identity as the SSB identity, and the S/C bit may not be included in FIGS. 4 and 5, and the position is set as R (reserved bit), or this bit is incorporated into the following 7 bits for the SSB/CSI-RS ID, and the SSB/CSI-RS ID is increased to 8 bits.

Alternatively, there is another situation, that is, the second indication information may not be included, that is, the S/C bit is not set. If the number of CSI-RSs is 192, then the CSI-RS ID needs to be 8 bits. When the SSB/CSI-RS ID occupies 8 bits, the new beam ID may be regarded as the CSI-RS ID; otherwise, the new beam ID may be regarded as the SSB ID. It should be pointed out that in a special situation, all 8 bits occupied by the SSB/CSI-RS ID can be set to 1; the special situation can be negotiated and determined in advance, or can be indicated by the network device, and embodiments of the present disclosure do not impose specific limitations on this.

The format of the first type of BFR MAC CE provided by this example will be described with reference to FIG. 5. The only difference from FIG. 4 is that a reversed bit is included:

R: reserved bit.

In comparison between FIG. 4 and FIG. 5, if the cells corresponding to the bitmap include a primary cell and a secondary cell, the format of FIG. 4 can be used, where the R bit does not need to be included in the bitmap; if the cells corresponding to the bitmap are secondary cells or secondary cells configured with BFR configuration information, the format provided in FIG. 5 can be used.

Example 2

As in Example 1, the second type of BFR MAC CE also uses a bitmap to indicate whether a corresponding cell has a beam failure.

The number of bits of the bitmap (or the size of the bitmap) can match the number of SCells.

The cell corresponding to each bit in the bitmap can be preset, and each cell has a corresponding identity (ID), such as cell index. An ascending order (or descending order) of indexes may correspond to a sequencing order from top to bottom and from left to right (or from right to left) in the bitmap, so that each bit in the bitmap corresponds to a cell.

For example, if the cells corresponding to the bitmap are multiple SCells, the SCell index order (such as ascending or descending order) can correspond to the order from left to right (or from right to left) and from top to bottom in the bitmap, so as to indicate whether a corresponding SCell has a beam failure through a corresponding bit.

Or, if the cells corresponding to the bitmap are multiple SCells configured with BFR configuration information, the order (such as ascending or descending order) of indexes of the SCells configured with BFR configuration can correspond to the order from left to right (or from right to left) and from top to bottom in the bitmap, so as to indicate whether a corresponding SCell configured with BFR configuration information has a beam failure through a corresponding bit. The BFR configuration may be sent to the terminal device in advance by the network device, for example, the BFR configuration may be sent to the terminal device through information such as RRC, DCI, etc., and embodiments of the present disclosure do not impose specific limitations on this. In this case, the bits in the bitmap only need to indicate whether beam failure occurs in the SCells capable of performing BFR.

Or, if the cells corresponding to the bitmap include both a primary cell and SCells, then a certain bit can be designated to indicate whether the primary cell has a beam failure, and the remaining bits can correspond to the Scells according to the aforementioned order to indicate whether a corresponding SCell has a beam failure.

The difference from Example 1 is that the second type of BFR MAC CE may only include the new beam identities corresponding to a part of cells where the beam failure occurs among all the cells where the beam failure occurs.

Regarding how many new beam identities corresponding to the cells where the beam failure occurs can be included in the second type of BFR MAC CE can be determined according to the size of the UL grant resource.

For example, if the size of the UL grant resource scheduled by the network device for the terminal device is not enough to carry the new beam identities corresponding to all the cells where the beam failure occurs, then the second type of BFR MAC CE can be selected to carry the new beam identities corresponding to a part of the cells where the beam failure occurs.

For example, for the bitmap of the second type of BFR MAC CE, it is indicated that there are N cells where the beam failure occurs. Only the new beam identities of M SCells where the beam failure occurs are indicated, where M is an integer and smaller than N. In other words, the number of SCells for which new beam identities are sent is smaller than the number of SCells which are set as 1 in the bitmap.

In another case, the second type of BFR MAC CE does not include the new beam identities of the SCells where the beam failure occurs. That is, M may be equal to zero.

It should also be pointed out here that in the foregoing Example 1 and Example 2, the new beam may be a beam that exceeds a preset quality threshold in a corresponding cell (such as a SCell). If there are multiple beams that exceed the preset quality threshold in a cell, one of them can be randomly selected as the new beam to report; or, the beam with the best quality can be selected as a new beam. The quality of a beam can be measured by parameters such as RSRP, SNR, etc. Correspondingly, the quality threshold can be one or a combination of a RSRP threshold and a SNR threshold, and embodiments of the present disclosure do not provide all examples.

The indication method of the new beam identity in this example is the same as that in the foregoing Example 1.

The difference from Example 1 is that when the second type of BFR MAC CE includes new beam identities corresponding to a part of the SCells where the beam failure occurs, the second type of MAC CE further includes second indication information which is used to indicate that the new beam identities corresponding to the part of the SCells where the beam failure occurs are SSB identities or CSI-RS identities.

If the second type of BFR MAC CE does not include the new beam identity(identities), then the second indication information may not be included.

Figure 6:
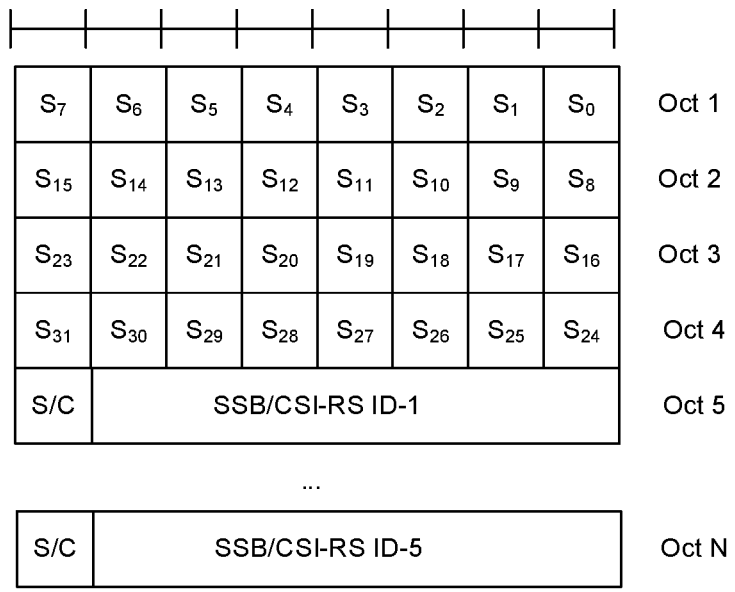

For example, referring to FIG. 6, if the number of SCells which currently has the beam failure is 8, but the currently available UL grant can only report the beam indexes of 5 SCells, then the truncated BFR MAC CE format can be used currently.

For example, the bits corresponding to the 8 SCells can be set to 1, but there are only 5 beam indexes that follow. In this case, the network can allocate UL grant(s) to the terminal device based on how many SCells have not yet reported the beam indexes.

In addition, in conjunction with Example 1, which format the terminal device uses to send BFR may be determined by one of the following methods. Using these methods, the first and second types of BFR MAC CE may be distinguished.

Method 1

The terminal device uses a Logical Channel identity LCID to indicate a BFR MAC CE format type used by the terminal device.

Specifically, the format of the BFR MAC CE can be determined through the LCID in the subheader of the MAC CE.

For example, referring to Table 1 below, two LCID values are set to correspond to two types of BFR MAC CE.

For example, an LCID value of 51 corresponds to the first type of BFR MAC CE, and an LCID index value of 50 corresponds to the second type of BFR MAC CE:

TABLE 1

| Index | LCID values |
|---|---|
| 0 | CCCH of size 64 bits |
| 1-32 | Identity of the logical channel |
| 33-49 | Reserved |
| 52 | CCCH of size 48 bits |
| 53 | Recommended bit rate query |
| 54 | Multiple Entry PHR |
| 55 | Configured Grant Confirmation |
| 56 | Multiple Entry PHR (one octet Ci) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |
| 51 | full/long BFR MAC CE (first type of BFR MAC CE) |
| 50 | (long) truncated BFR MAC CE (second type of BFR MAC CE) |

Method 2

The BFR MAC CE further carries first indication information.

The first indication information is used to indicate the BFR MAC CE format type adopted by the terminal device.

In this example, the first indication information may be the reserved bit R in the bitmap. For example, referring to FIG. 5, if R is set to 1, then the MAC CE is (long) truncated BFR MAC CE (that is, the second type of BFR MAC CE); if R is set to 0, then the MAC CE is full/long BFR MAC CE (that is, the first type of BFR MAC CE).

Example 3

The third type of BFR MAC CE is different from the foregoing Examples 1 and 2 in that the third type of BFR MAC CE includes the identity (ID) of at least one SCell where the beam failure occurs. Specifically, the third type of BFR MAC CE may include a SCell index. In other words, the third type of BFR MAC CE uses the index of at least one SCell to indicate the at least one SCell where the beam failure occurs. That is, the third type of BFR MAC CE only contains index(es) of SCell(s) where the beam failure occurs, and does not include the index of a SCell where beam failure does not occur.

The third type of MAC CE further contains a new beam identity corresponding to the at least one SCell where the beam failure occurs. The manner of selecting the new beam corresponding to the SCell where the beam failure occurs is the same as the foregoing Examples 1 and 2, and will not be repeated here.

According to some embodiments, the third type of BFR MAC CE may only include the index of one Scell where the beam failure occurs. In this case, if only one SCell currently has the beam failure, then the third type of BFR MAC CE can be selected. Correspondingly, it is only necessary to further include a new beam identity corresponding to the SCell where the beam failure occurs.

The new beam identity is: the SSB identity or the CSI-RS identity.

The first type of BFR MAC CE and the third type of BFR MAC CE further include second indication information which is used to indicate that the beam identity is the SSB identity or the CSI-RS identity.

For the setting and examples of the second indication information in this example, please refer to Example 1, which will not be repeated here.

Example 4

The fourth type of BFR MAC CE is different from the foregoing Examples 1 and 2 in that the fourth type of BFR MAC CE includes the identity (ID) of at least one SCell where the beam failure occurs. Specifically, the fourth type of BFR MAC CE may include a SCell index. In other words, the fourth type of BFR MAC CE uses the index of at least one SCell to indicate the at least one SCell where the beam failure occurs. That is, the fourth type of BFR MAC CE only contains index(es) of SCell(s) where the beam failure occurs, and does not include the index of a SCell where the beam failure does not occur.

The fourth type of BFR MAC CE includes or does not include the new beam identity corresponding to the at least one SCell where the beam failure occurs.

In one case, if the fourth type of MAC CE includes the new beam identity corresponding to the at least one SCell where the beam failure occurred, the manner of selecting the new beam corresponding to the at least one SCell where the beam failure occurs is the same as the foregoing Examples 1 and 2, and will not be repeated here.

According to some embodiments, the fourth type of BFR MAC CE may only include the index of one Scell where the beam failure. In this case, if only one SCell currently has the beam failure, then the fourth type of BFR MAC CE can be selected. Correspondingly, it is only necessary to further include the new beam identity corresponding to the SCell where the beam failure occurs.

In this case, the difference between the fourth type of BFR MAC CE and the third type of BFR MAC CE is that, if there is currently only one SCell with beam failure, the third type of BFR MAC CE can be selected; if there are currently two or more SCells with beam failure, the fourth type of BFR MAC CE can be selected. Under such condition, the third type of BFR MAC CE and the fourth type of BFR MAC CE can be distinguished by LCID.

Furthermore, if the network device determines that the terminal device uses the fourth type of BFR MAC CE according to the LCID, it can be considered that the terminal device does not currently transmit situations regarding all the SCells where the beam failure occurs, and the network device can schedule corresponding UL grant resources for the terminal device to enable the terminal device to further send the remaining SCells where the beam failure occurs.

In this case, when the fourth type of BFR MAC CE includes the new beam identity corresponding to the at least one SCell where the beam failure occurs, the fourth type of MAC CE further includes second indication information which is used to indicate that the new beam identity corresponding to the at least one SCell where the beam failure occurs is the SSB identity or the CSI-RS identity.

Regarding the indication mode of the new beam identity, the second indication information may be used. For the indication mode and description of the second indication information, please refer to the foregoing examples, and repeated descriptions will be omitted here.

In another case, the fourth type of BFR MAC CE may not include the new beam identity corresponding to the at least one SCell where the beam failure occurs.

In addition, in conjunction with Examples 3 and 4, which format the terminal device uses to send BFR may be determined by one of the following methods. Using these methods, the third and fourth types of BFR MAC CE may be distinguished.

Method 1

The terminal device uses a Logical Channel identity LCID to indicate a BFR MAC CE format type used by the terminal device.

Specifically, the format of the BFR MAC CE can be determined through the LCID in the subheader of the MAC CE.

For example, see Table 2 below:

TABLE 2

| Index | LCID values |
|---|---|
| 0 | CCCH of size 64 bits |
| 1-32 | Identity of the logical channel |
| 33-49 | Reserved |
| 52 | CCCH of size 48 bits |
| 53 | Recommended bit rate query |
| 54 | Multiple Entry PHR |
| 55 | Configured Grant Confirmation |
| 56 | Multiple Entry PHR (one octet Ci) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |
| 53 | first type of BFR MAC CE |
| 52 | second type of BFR MAC CE |
| 51 | third type of BFR MAC CE |
| 50 | fourth type of BFR MAC CE |

It can be seen from the above table that different LCIDs can be set to indicate different BFR MAC CE format types. The above selected values are 50, 51, 52, and 53, which can correspond to the fourth, third, second, and first type of BFR MAC CE, respectively. In actual processing, examples different from the above may be used, and different reserved LCIDs can be selected to correspond to different format types. Alternatively, the selected LCID values may be the same as the above table, but corresponding format types of the MAC CE may be different from the above table. Embodiments of the present disclosure do not list all examples here.

Method 2

The BFR MAC CE further carries first indication information.

The first indication information is used to indicate the BFR MAC CE format type adopted by the terminal device.

In this example, the first indication information can be the reserved bit R in the bitmap.

For example, referring to FIG. 5, if R is set to 1, then the MAC CE is the third type of BFR MAC CE; if R is set to 0, the MAC CE is the fourth type of BFR MAC CE.

It needs to be pointed out that, in combination with Examples 1-4, the third and fourth types of BFR MAC CE and the first and second types of BFR MAC CE can be distinguished by directly using a bitmap to indicate at least one SCell where the beam failure occurs or directly indicating at least one SCell index; or, the four types of BFR MAC CE may be distinguished by different LCIDs; or, two R bits, for example 00, 01, 10, and 11 may be used to indicate different types of BFR MAC CE, respectively.

Example 5

Based on the foregoing multiple examples, how the terminal device determines the BFR MAC CE format type to be adopted can be as follows:

The terminal device determines the BFR MAC CE format type used by the terminal device based on the size of the uplink UL grant resource and/or the number of SCells where the beam failure occurs.

For example, if the size of the UL grant resource is sufficient to send the first type of BFR MAC CE, the first type of BFR MAC CE may be used; if the size of the UL grant resource is smaller than the size of the resource required by the first type of BFR MAC CE but larger than the size of the resource required by the second type of BFR MAC CE, then the UL grant resource may be used to send the second type of BFR MAC CE.

Furthermore, if only the third type of BFR MAC CE can be sent, then the third type of BFR MAC CE is sent; finally, if the first three types cannot be sent, the fourth type of BFR MAC CE is sent.

If the number of SCells where the beam failure occurs is relatively large, the first type of BFR MAC CE may be used; if the number of SCells where the beam failure occurs is relatively small, the second type of BFR MAC CE may be used. As another example, if only one SCell has beam failure at present, then the third type of BFR MAC CE may be selected. If there are two or more SCells where the beam failure occurs, the fourth type of BFR MAC CE may be selected, and LCID is used to indicate to the network device that the fourth type of BFR MAC CE is used, so that the network device knows that there are currently SCells for which a new beam has not been sent, and then the network device continue to allocate UL grant resources for the terminal device.

Furthermore, taking both UL grant resources and the number of SCells into consideration, if the current UL grant resources are sufficient to transmit the first type of BFR MAC CE and only one SCEll has beam failure, then the third type of BFR MAC CE may be used;
  if the UL grant resources are relatively small but the number of SCells is relatively large, then the second type of BFR MAC CE may be used;
  if the UL grant resources are relatively large and the number of SCells is relatively large, the first type of BFR MAC CE may be used;
  if the UL grant resources are relatively small and the number of SCells is relatively small (for example, just one SCell), the third or fourth type of BFR MAC CE may be used.

For example, the following logic can be used to select the MAC CE format:
  1> If the size of the available UL grant resources is equal to or greater than the third type of BFR MAC CE (may be called as short BFR MAC CE) plus its subheader, but is smaller than the first type of BFR MAC CE (may be called as long BFR MAC CE) plus its subheader;
    2> if the number of SCells where the beam failure occurs is greater than 1:
      3> if the available UL grant resources are equal to the third type of BFR MAC CE (short BFR MAC CE) plus the subheader;
        4> use the fourth type of MAC CE (short truncated BFR MAC CE) and indicate one SCell where the beam failure occurs (it should be understood that the one SCell may be randomly selected from multiple SCells, or the one SCell may be selected according to configured selection priority, and the configuration may be made by the network device for the terminal device).
      3> otherwise:
        4> use the second type of MAC CE (may be called as long truncated BFR MAC CE) to indicate at least one SCell where the beam failure occurs (the at least one SCell may be arranged in an ascending or descending order of index of the at least one SCell).
    2> otherwise:
      3> use the third type of BFR MAC CE (may be called as report short BFR MAC CE).
  1> otherwise, if the size of the available UL grant resources is equal to or greater than the size of the first type BFR MAC CE plus the subheader:
    2> use long BSR to report all logical channel groups (LCGs) that have data to be transmitted. Here, the following steps may be further included: when there are multiple SCells that need to be reported, the first type of BFR MAC CE is used to report all the SCells, and if there is only one SCell with beam failure that needs to be reported, the third type of BFR MAC CE is used.

Example 6

In another case, based on the foregoing Examples 1 and 2, the manner in which the terminal device determines the BFR MAC CE format type to be adopted may be as follows:

The terminal device determines the BFR MAC CE format type adopted by the terminal device based on the size of the uplink UL grant resources and/or the number of SCells where the beam failure occurs.

For example, if the size of the UL grant resources is sufficient to transmit the first type of BFR MAC CE (and its subheader), the first type of BFR MAC CE may be used;
  if the size of the UL grant resources is smaller than the size of the resource required by the first type of BFR MAC CE, but is greater than size of the resource required by the second type of BFR MAC CE, then the UL grant resources can be used to send the second type of BFR MAC CE.

For another example, if there are a large number of SCells where the beam failure occurs and the size of the UL grant resources cannot enable transmission of the first type of BFR MAC CE, the second type of BFR MAC CE can be used. This is because the second type of BFR MAC CE allows the number of transmitted new beam identities to be smaller than the number of SCells where the beam failure occurs indicated in the bitmap.

In addition, in this case, in order to transmit the content corresponding to the remaining SCells, an SR needs to be sent to the network device to obtain new UL grant resources scheduled by the network device for the remaining SCells for transmission.

In another case, there is only the second type of MAC CE format. That is to say, after the network device receives the second type of BFR MAC CE, the network device compares the number of "1" in the SCell bitmap and the number of beam indexes carried to determine whether terminal device need additional UL grant.

In this case, the second type of MAC CE is of a variable length, the shortest length only carries a bitmap, and there is only one LCID.

Example 7

Combining the foregoing multiple examples, this example may further include: perform, by the terminal device, beam failure detection for each of cells; where the cells include a primary cell and a SCell.

That is to say, before performing the aforementioned step 21, the terminal device may perform beam failure detection per cell, determine at least one SCell where the beam failure occurs according to the failure detection result, and determine a new beam for the at least one Scell where the beam failure occurs.

The specific processing method for each cell is similar to the aforementioned BFR procedure, and repeated description will be omitted here.

Example 8

Combining the foregoing multiple examples, before the terminal device reports the BFR MAC CE, the following steps may be included:
  determining, by the terminal device, whether there is an available UL grant resource;
  if the terminal device determines that there is no available UL grant resource, triggering, by the terminal device, to send a BFR Scheduling Request (SR) to the network device;
  wherein the BFR SR is used to request to the network device a UL grant resource for sending the BFR MAC CE.

In other words, the terminal device also determines whether there is an available UL grant. If there is no UL grant currently available, the UE triggers a BFR SR, and the BFR SR is used to request a UL grant resource for sending the BFR MAC CE.

Example 9

Based on all the foregoing examples, after reporting the BFR MAC CE, whether to stop the SR triggered by at least one S cell may include the following processing methods:
Method 1
  If the terminal device sends the BFR MAC CE on the UL grant resource, the terminal device stops SRs triggered by all SCells where the beam failure occurs.

In this way, as long as the terminal device sends the BFR MAC CE, the Scheduling Requests (SRs) triggered by all SCells may be stopped (or cancelled, or deleted). The SR is used to request to the network device a UL grant resource for sending the BFR MAC CE.

The BFR MAC CE may include four MAC CE formats as described in Examples 1 to 4.
Method 2
  If the terminal device sends the first type of BFR MAC CE or the third type of BFR MAC CE on the UL grant resource(s), the terminal device stops or cancels all pending SRs triggered by the SCells where the beam failure occurs;
or,
  if the terminal device sends the second type of BFR MAC CE or the fourth type of BFR MAC CE on the UL grant resource(s), the terminal device stops or cancels SRs triggered by a part of SCells with beam failure which are included in the second type of BFR MAC CE or the fourth type of BFR MAC CE.

That is to say, if the first type of BFR MAC CE is currently used to send the relevant information of the SCells where the beam failure occurs, there is no need to trigger a SR again.

If the third type of BFR MAC CE is used, SR may not be triggered.

In addition, if the second type of BFR MAC CE and the fourth type of BFR MAC CE are used, there may be multiple remaining SCells for which BFR information has not been reported, and a SR can be triggered again to obtain a UL grant resource for sending the BFR information for the remaining SCells which has not been reported.

As can be seen from the above, using the technical solutions according to embodiments of the present disclosure, the terminal device indicates to the network device at least one SCell where the beam failure occurs, so that the network device can know the current number of SCells where the beam failure occurs for the terminal device, and then determine a corresponding uplink grant resource allocated to the terminal device. In this way, the technical solutions can improve the processing efficiency of network device and resource utilization.

Figure 7:
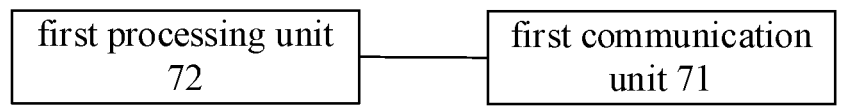
FIG. 7 is a schematic diagram of the composition structure of a terminal device according to an embodiment of the present disclosure.

An embodiment of the present disclosure provides a terminal device. As shown in FIG. 7, the terminal device includes a first communication unit 71.

The first communication unit 71 is configured to send a Beam Failure Recovery (BFR) Media Access Control (MAC) Control Element (CE) to a network device.

The BFR MAC CE is used to indicate at least one Secondary Cell (SCell) where a beam failure occurs.

Figure 8:
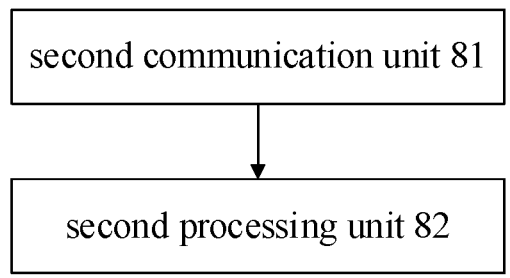
FIG. 8 is a schematic diagram of the composition structure of a network device according to an embodiment of the present disclosure.

Correspondingly, an embodiment further provides a network device. As shown in FIG. 8, the network device includes a second communication unit 81.

The second communication unit 81 is configured to receive the BFR MAC CE sent by the terminal device.

The BFR MAC CE is used to indicate at least one Secondary Cell (SCell) where a beam failure occurs.

The network device may be a base station on the network side, such as eNG, gNB, etc., and not all embodiments are listed herein.

In the solutions provided in embodiments, the BFR MAC CE may include identity of at least one SCell where the beam failure occurs.

Alternatively, a bitmap is included in the BFR MAC CE; each bit in the bitmap is used to indicate whether beam failure occurs in a corresponding cell. Here, the corresponding cell can be: a secondary cell; or, a secondary cell configured with BFR configuration, or a primary cell and a secondary cell.

Based on this, embodiments can provide multiple format types of BFR MAC CE. Specifically:

The BFR MAC CE format type includes at least one of the following: a first type of BFR MAC CE, a second type of BFR MAC CE, a third type of BFR MAC CE, and a fourth type of BFR MAC CE.

The first type of BFR MAC CE may be understood as a long MAC CE.

The second type of BFR MAC CE may be understood as a truncated long MAC CE.

The third type of BFR MAC CE may be a short MAC CE.

The fourth type of BFR MAC CE may be a truncated short MAC CE.

The types of BFR MAC CEs will be described separately.

Each of the first type of BFR MAC CE and the second type of BFR MAC CE includes a bitmap, and each bit in the bitmap is used to indicate whether a corresponding cell has a beam failure.

Each bit in the bitmap is used to indicate the corresponding cell which is a SCell;

or, each bit in the bitmap is used to indicate the corresponding cell which is a SCell configured with BFR configuration information;

or, each bit in the bitmap is used to indicate the corresponding cell which is a serving cell, and the serving cell is a Primary Cell (PCell) or a SCell.

The third type of BFR MAC CE and the fourth type of BFR MAC CE include a SCell index.

The first type of BFR MAC CE and the third type of BFR MAC CE further include: a new beam identity corresponding to the at least one SCell where the beam failure occurs;

the second type of BFR MAC CE further includes a new beam identity corresponding to a part of the at least one SCell where the beam failure occurs, or does not include the new beam identity corresponding to the at least one SCell where the beam failure occurs;

the fourth type of BFR MAC CE includes the new beam identity corresponding to the at least one SCell where the beam failure occurs, or does not include the new beam identity corresponding to the at least one SCell where the beam failure occurs.

Examples are described below in detail.

Example 1

The first type of BFR MAC CE (or the second type of BFR MAC CE) contains a bitmap. The bitmap may contain multiple bits, and each bit is used to indicate whether a corresponding cell has a beam failure.

If a certain bit is set as a first value, it can be understood that the cell corresponding to the bit has a beam failure; if the bit is set as a second value, it can be understood that the cell corresponding to the bit has no beam failure.

The first value may be "1" and the second value may be "0". Of course, if the terminal device and the network device agree upon mutual agreement, the first value may be set to "0" and the second value can be set to "1".

The cells corresponding to the bitmap may be one or more SCells, or may be one or more SCells which are pre-configured as capable of performing BFR, or may be a primary cell and SCells.

In addition, the length of the bitmap is determined by how many serving cells the terminal device supports.

For example, the terminal device supports 32 serving cells, and the bitmap is 4 bytes.

The new beam identity is: a SSB identity or a CSI-RS identity.

Correspondingly, according to some embodiments, the first type of BFR MAC CE further includes second indication information for indicating that the beam identity is an SSB identity or a CSI-RS identity.

In this example, the second indication information may be a certain bit in the first type of MAC CE, and the bit is used to indicate that the following multiple bits are indicated SSB identities or CSI-RS identities.

Example 2

As in Example 1, the second type of BFR MAC CE also uses a bitmap to indicate whether a corresponding cell has a beam failure.

The number of bits of the bitmap (or the size of the bitmap) can match the number of SCells.

The difference from Example 1 is that the second type of BFR MAC CE may only include the new beam identities corresponding to a part of cells where the beam failure occurs among all the cells where the beam failure occurs.

Regarding how many new beam identities corresponding to the cells where the beam failure occurs can be included in the second type of BFR MAC CE can be determined according to the size of the UL grant resource.

The indication method of the new beam identity in this example is the same as that in the foregoing Example 1.

The difference from Example 1 is that when the second type of BFR MAC CE includes new beam identities corresponding to a part of the SCells where the beam failure occurs, the second type of MAC CE further includes second indication information which is used to indicate that the new beam identities corresponding to the part of the SCells where the beam failure occurs are SSB identities or CSI-RS identities.

If the second type of BFR MAC CE does not include the new beam identity(identities), then the second indication information may not be included.

In addition, in conjunction with Example 1, which format the terminal device uses to send BFR may be determined by one of the following methods. Using these methods, the first and second types of BFR MAC CE may be distinguished.

Method 1

The terminal device further includes a first processing unit 72 configured to use a Logical Channel identity LCID to indicate a BFR MAC CE format type used by the terminal device.

The network device further includes a second processing unit 82.

The second processing unit 82 is configured to determine the BFR MAC CE format type used by the terminal device according to the LCID.

Method 2

The BFR MAC CE further carries first indication information.

The first indication information is used to indicate the BFR MAC CE format type adopted by the terminal device.

Example 3

The third type of BFR MAC CE is different from the foregoing Examples 1 and 2 in that the third type of BFR MAC CE includes the identity (ID) of at least one SCell where the beam failure occurs. Specifically, the third type of BFR MAC CE may include a SCell index. In other words, the third type of BFR MAC CE uses the index of at least one SCell to indicate the at least one SCell where the beam failure occurs. That is, the third type of BFR MAC CE only contains index(es) of SCell(s) where the beam failure occurs, and does not include the index of a SCell where the beam failure does not occur.

The third type of MAC CE further contains a new beam identity corresponding to the at least one SCell where the beam failure occurs. The manner of selecting the new beam corresponding to the SCell where the beam failure occurs is the same as the foregoing Examples 1 and 2, and will not be repeated here.

The new beam identity is: the SSB identity or the CSI-RS identity.

The first type of BFR MAC CE and the third type of BFR MAC CE further include second indication information which is used to indicate that the beam identity is the SSB identity or the CSI-RS identity.

For the setting and examples of the second indication information in this example, please refer to Example 1, which will not be repeated here.

Example 4

The fourth type of BFR MAC CE is different from the foregoing Examples 1 and 2 in that the fourth type of BFR MAC CE includes the identity (ID) of at least one SCell where the beam failure occurs. Specifically, the fourth type of BFR MAC CE may include a SCell index. In other words, the fourth type of BFR MAC CE uses the index of at least one SCell to indicate the at least one SCell where the beam failure occurs. That is, the fourth type of BFR MAC CE only contains index(es) of SCell(s) where the beam failure occurs, and does not include the index of a SCell where the beam failure does not occur.

The fourth type of BFR MAC CE includes or does not include the new beam identity corresponding to the at least one SCell where the beam failure occurs.

In one case, if the fourth type of MAC CE includes the new beam identity corresponding to the at least one SCell where the beam failure occurred, the manner of selecting the new beam corresponding to the at least one SCell where the beam failure occurs is the same as the foregoing Examples 1 and 2, and will not be repeated here.

Furthermore, if the second processing unit 82 of the network device determines that the terminal device uses the fourth type of BFR MAC CE according to the LCID, it can be considered that the terminal device does not currently transmit situations regarding all the SCells where the beam failure occurs, and the network device can schedule corresponding UL grant resources for the terminal device to enable the terminal device to further send the remaining SCells where the beam failure occurs.

Regarding the indication mode of the new beam identity, the second indication information may be used. For the indication mode and description of the second indication information, please refer to the foregoing examples, and repeated descriptions will be omitted here.

In another case, the fourth type of BFR MAC CE may not include the new beam identity corresponding to the at least one SCell where the beam failure occurs.

In addition, in conjunction with Examples 3 and 4, which format the terminal device uses to send BFR may be determined by one of the following methods. Using these methods, the third and fourth types of BFR MAC CE may be distinguished.

Method 1

The terminal device uses a Logical Channel identity LCID to indicate a BFR MAC CE format type used by the terminal device.

Method 2

The BFR MAC CE further carries first indication information. The first indication information is used to indicate the BFR MAC CE format type adopted by the terminal device.

Example 5

Based on the foregoing multiple examples, how the terminal device determines the BFR MAC CE format type to be adopted can be as follows:

The first processing unit 72 of the terminal device determines the BFR MAC CE format type used by the terminal device based on the size of the uplink UL grant resource and/or the number of SCells where the beam failure occurs.

Combining the foregoing multiple examples, the following may be further include: perform, by the first communication unit 71 of the terminal device, beam failure detection for each of cells; where the cells include a primary cell and a SCell.

Before the terminal device reports the BFR MAC CE, the following steps may be included:

determining, by the first processing unit 72 of the terminal device, whether there is an available UL grant resource;

if it is determined that there is no available UL grant resource, triggering, by the first communication unit 71 of the terminal device, to send a BFR Scheduling Request (SR) to the network device;

wherein the BFR SR is used to request to the network device a UL grant resource for sending the BFR MAC CE.

Based on all the foregoing examples, after reporting the BFR MAC CE, whether to stop the SR triggered by at least one S cell may include the following processing methods:

Method 1

If the first communication units 71 sends the BFR MAC CE on the UL grant resource, the terminal device stops SRs triggered by all SCells where the beam failure occurs.

Method 2

If the first type of BFR MAC CE or the third type of BFR MAC CE is sent on the UL grant resource(s) by the first communication unit 71, the terminal device stops or cancels all SRs triggered by the SCells where the beam failure occurs;

or, if the second type of BFR MAC CE or the fourth type of BFR MAC CE is sent on the UL grant resource(s), the terminal device stops or cancels SRs triggered by a part of SCells with beam failure which are included in the second type of BFR MAC CE or the fourth type of BFR MAC CE.

That is to say, if the first type of BFR MAC CE is currently used to send the relevant information of the SCells where the beam failure occurs, there is no need to trigger a SR again.

If the third type of BFR MAC CE is used, SR may not be triggered.

As can be seen from the above, using the technical solutions according to embodiments of the present disclosure, the terminal device indicates to the network device at least one SCell where the beam failure occurs, so that the network device can know the current number of SCells where the beam failure occurs for the terminal device, and then determine a corresponding uplink grant resource allocated to the terminal device. In this way, the technical solutions can improve the processing efficiency of network device and resource utilization.

Figure 9:
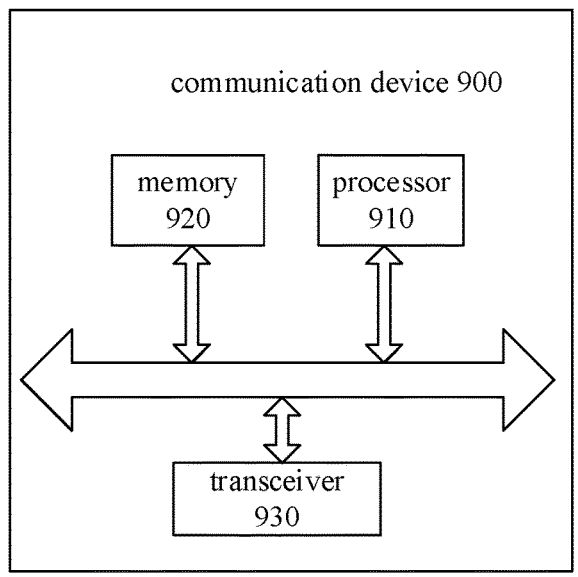
FIG. 9 is a schematic diagram of the composition structure of a communication device according to an embodiment of the present disclosure.

FIG. 9 is a schematic structural diagram of a communication device 900 according to an embodiment of the present disclosure. The communication device in embodiments of the present disclosure may be the network device in the previous embodiments. The communication device 900 shown in FIG. 9 includes a processor 910, and the processor 910 may call and run a computer program from a memory to perform the method in embodiments of the present disclosure.

According to embodiments, as shown in FIG. 8, the communication device 900 may further include a memory 920. The processor 910 may call and run a computer program from the memory 920 to perform the method in embodiments of the present disclosure.

The memory 920 may be a separate device independent of the processor 910, or may be integrated in the processor 910.

According to embodiments, as shown in FIG. 9, the communication device 900 may further include a transceiver 930, and the processor 910 may control the transceiver 930 to communicate with other devices. Specifically, the transceiver may send information or data to other devices, or receive information or data sent by other devices.

The transceiver 930 may include a transmitter and a receiver. The transceiver 930 may further include one or more antennas.

According to embodiments, the communication device 900 may specifically be the network device according to embodiments of the present disclosure, and the communication device 900 may implement the corresponding processes implemented by the network device in the method embodiments of the present disclosure.

According to embodiments, the communication device 900 may specifically be the terminal device or network device according to embodiments of the present disclosure, and the communication device 900 may implement the corresponding processes implemented by the mobile terminal/terminal device in the method embodiments of the present disclosure.

Figure 10:
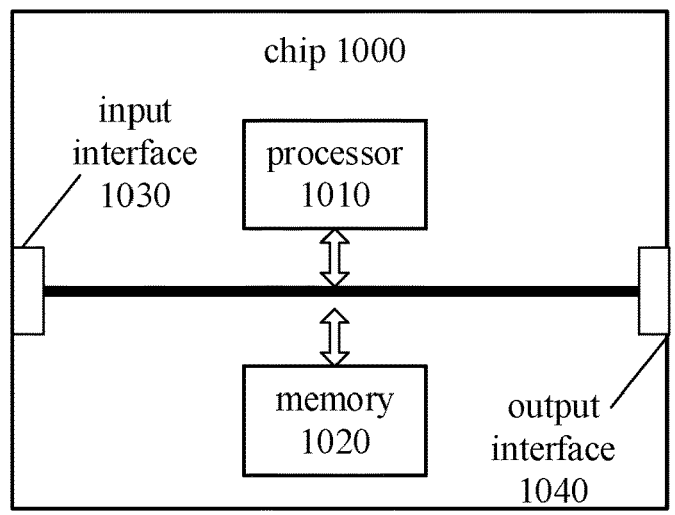
FIG. 10 is a schematic block diagram of a chip according to an embodiment of the present disclosure.

FIG. 10 is a schematic structural diagram of a chip according to an embodiment of the present disclosure. The chip 1000 shown in FIG. 10 includes a processor 1010, and the processor 1010 can call and run a computer program from a memory to implement the method according to embodiments of the present disclosure.

According to embodiments, as shown in FIG. 10, the chip 1000 may further include a memory 1020. The processor 1010 may call and run a computer program from the memory 1020 to implement the method according to embodiments of the present disclosure.

The memory 1020 may be a separate device independent of the processor 1010, or may be integrated in the processor 1010.

According to embodiments, the chip 1000 may further include an input interface 1030. The processor 1010 may control the input interface 1030 to communicate with other devices or chips, and specifically, the processor 1010 can control the input interface to obtain information or data sent by other devices or chips.

According to embodiments, the chip 1000 may further include an output interface 1040. The processor 1010 can control the output interface 1040 to communicate with other devices or chips, and specifically, the processor 1010 can control the output interface 1040 to output information or data to other devices or chips.

According to embodiments, the chip can be applied to the network device in embodiments of the present disclosure, and the chip can implement the corresponding processes implemented by the terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive.

For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

Figure 11:
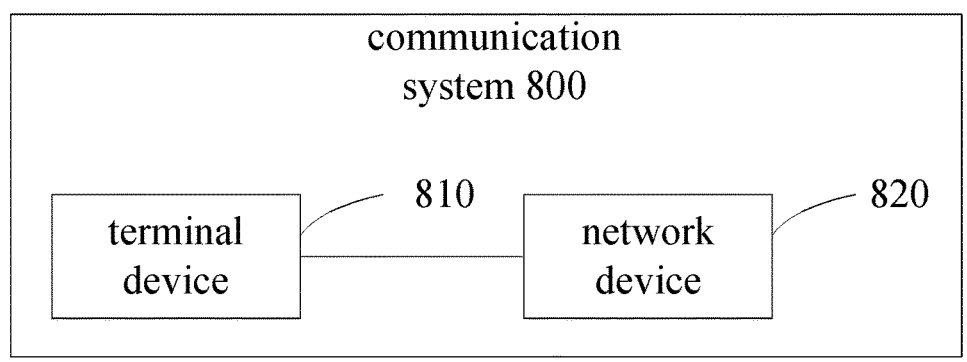
FIG. 11 is a schematic diagram of a communication system architecture according to an embodiment of the present disclosure.

FIG. 11 is a schematic block diagram of a communication system 800 according to an embodiment of the present disclosure. As shown in FIG. 11, the communication system 800 includes a terminal device 810 and a network device 820.

The terminal device 810 may be used to implement the corresponding functions implemented by UE in the foregoing method embodiments, and the network device 820 may be used to implement the corresponding functions implemented by the network device in the foregoing method embodiments. For brevity, details are not described herein again.

An embodiment of the present disclosure also provides a computer-readable storage medium for storing computer programs.

According to embodiments, the computer-readable storage medium may be applied to the network device or terminal device in embodiments of the present disclosure, and the computer programs cause a computer to perform the corresponding processes implemented by the network device in each method embodiment of the present disclosure. For brevity, repeated descriptions are omitted here.

An embodiment of the present disclosure provides a computer program product, including computer program instructions.

According to embodiments, the computer program product may be applied to the network device or terminal device in embodiments of the present disclosure, and the computer program instructions cause a computer to perform the corresponding processes implemented by the network device in each method embodiment of the present disclosure. For brevity, repeated descriptions are omitted here.

An embodiment of the present disclosure also provides a computer program.

According to embodiments, the computer program may be applied to the network device or terminal device in embodiments of the present disclosure, and when the computer program runs on a computer, the computer is caused to perform the corresponding processes implemented by the network device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways.

For example, the device embodiments described above are merely illustrative.

For example, the division of the units is only a kind of logical function division. In practice, other division manner may be used.

For example, multiple units or components may be combined or integrated into another system, or some features may be ignored or not performed.

In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An indication method, comprising:
   sending, by a terminal device, a Beam Failure Recovery (BFR) Media Access Control (MAC) Control Element (CE) to a network device;
   wherein the BFR MAC CE is used to indicate at least one Secondary Cell (SCell) where a beam failure occurs;
   wherein the method further comprises:
   determining, by the terminal device, a BFR MAC CE format type used by the terminal device based on a size of an uplink (UL) grant resource and the number of SCells where the beam failure occurs;
   wherein the BFR MAC CE format type comprises a first type of BFR MAC CE and a second type of BFR MAC CE;
   wherein each of the first type of BFR MAC CE and the second type of BFR MAC CE comprises a bitmap, and each bit in the bitmap is used to indicate whether a corresponding cell has a beam failure;
   wherein the first type of BFR MAC CE further comprises: a new beam identity corresponding to the at least one SCell where the beam failure occurs;
   wherein the second type of BFR MAC CE further comprises a new beam identity corresponding to a part of the at least one SCell where the beam failure occurs, wherein the second type of MAC CE comprises a truncated BFR MAC CE.

2. The method according to claim 1, wherein the BFR MAC CE comprises identity (ID) of the at least one SCell where the beam failure occurs.

3. The method according to claim 1, wherein the BFR MAC CE is further used to indicate a new beam identity.

4. The method according to claim 1, further comprising:
   indicating, by the terminal device, the BFR MAC CE format type used by the terminal device using a Logical Channel identity (LCID).

5. The method according to claim 1, wherein the BFR MAC CE format type further comprises at least one of a third type of BFR MAC CE, and a fourth type of BFR MAC CE.

6. The method according to claim 1, wherein
each bit in the bitmap is used to indicate the corresponding cell which is a serving cell, and the serving cell is a Primary Cell (PCell) or a SCell.

7. The method according to claim 5, wherein the third type of BFR MAC CE further comprise: a new beam identity corresponding to the at least one SCell where the beam failure occurs;
wherein the fourth type of BFR MAC CE comprises the new beam identity corresponding to the at least one SCell where the beam failure occurs, or does not comprise the new beam identity corresponding to the at least one SCell where the beam failure occurs.

8. The method according to claim 7, wherein the new beam identity is: an SSB identity or a CSI-RS identity.

9. The method according to claim 1, further comprising:
determining, by the terminal device, whether there is an available UL grant resource; and
in response to the terminal device determining that there is no available UL grant resource, triggering, by the terminal device, to send a BFR Scheduling Request (SR) to the network device;
wherein the BFR SR is used to request to the network device a UL grant resource for sending the BFR MAC CE.

10. The method according to claim 1, further comprising:
in response to the terminal device sending the BFR MAC CE on the UL grant resource, stopping, by the terminal device, all SRs triggered by the at least one SCell where the beam failure occurs.

11. The method according to claim 1, further comprising:
performing, by the terminal device, beam failure detection for each of cells, wherein the cells comprise a primary cell and a SCell.

12. A terminal device, comprising one or more processors, memory storing a plurality of programs that, when executed by the one or more processors, cause the terminal device to:
send a Beam Failure Recovery (BFR) Media Access Control (MAC) Control Element (CE) to a network device;
wherein the BFR MAC CE is used to indicate at least one Secondary Cell (SCell) where a beam failure occurs;
wherein when the plurality of programs are executed by the one or more processors, the terminal device is caused to:
determine a used BFR MAC CE format type based on a size of an uplink (UL) grant resource and the number of SCells where the beam failure occurs;
wherein the BFR MAC CE format type comprises a first type of BFR MAC CE and a second type of BFR MAC CE;
wherein each of the first type of BFR MAC CE and the second type of BFR MAC CE comprises a bitmap, and each bit in the bitmap is used to indicate whether a corresponding cell has a beam failure;
wherein the first type of BFR MAC CE further comprises: a new beam identity corresponding to the at least one SCell where the beam failure occurs;
wherein the second type of BFR MAC CE further comprises a new beam identity corresponding to a part of the at least one SCell where the beam failure occurs, wherein the second type of MAC CE comprises a truncated BFR MAC CE.

13. The terminal device according to claim 12, wherein the BFR MAC CE comprises identity (ID) of the at least one SCell where the beam failure occurs.

14. The terminal device according to claim 12, wherein the BFR MAC CE is further used to indicate a new beam identity.

15. The terminal device according to claim 12, wherein when the plurality of programs are executed by the one or more processors, the terminal device is caused to:
indicate the BFR MAC CE format type used by the terminal device using a Logical Channel identity (LCID).

16. The terminal device according to claim 12, wherein the BFR MAC CE format type further comprises at least one of a third type of BFR MAC CE, and a fourth type of BFR MAC CE.

17. The terminal device according to claim 12, wherein each bit in the bitmap is used to indicate the corresponding cell which is a serving cell, and the serving cell is a Primary Cell (PCell) or a SCell.

18. The terminal device according to claim 16, wherein the third type of BFR MAC CE further comprise: a new beam identity corresponding to the at least one SCell where the beam failure occurs;
wherein the fourth type of BFR MAC CE comprises the new beam identity corresponding to the at least one SCell where the beam failure occurs, or does not comprise the new beam identity corresponding to the at least one SCell where the beam failure occurs.

19. The terminal device according to claim 18, wherein the new beam identity is: an SSB identity or a CSI-RS identity.

20. The terminal device according to claim 12, wherein when the plurality of programs are executed by the one or more processors, the terminal device is caused to:
determine whether there is an available UL grant resource; and
in response to the terminal device determining that there is no available UL grant resource, trigger to send a BFR Scheduling Request (SR) to the network device;
wherein the BFR SR is used to request to the network device a UL grant resource for sending the BFR MAC CE.

\* \* \* \* \*